United States Patent [19]

Matsuoka et al.

[11] Patent Number: 4,578,408

[45] Date of Patent: Mar. 25, 1986

[54] POLYESTER RESIN COMPOSITION RESISTANT AGAINST DISCOLORATION BY LIGHT

[75] Inventors: Masatoshi Matsuoka; Yukio Ikenaga, both of Fuji; Osamu Matsuno, Hyogo, all of Japan

[73] Assignee: Polyplastics Co., Ltd., Japan

[21] Appl. No.: 414,251

[22] PCT Filed: Dec. 7, 1981

[86] PCT No.: PCT/JP81/00370

§ 371 Date: Aug. 6, 1982

§ 102(e) Date: Aug. 6, 1982

[87] PCT Pub. No.: WO82/02053

PCT Pub. Date: Jun. 24, 1982

[51] Int. Cl.$^4$ .................... C08K 5/34; C08K 5/11; C08K 3/22

[52] U.S. Cl. .................... 524/91; 524/101; 524/291; 524/401; 524/408; 524/409; 524/494

[58] Field of Search .............. 524/86, 101, 467, 91, 524/291, 293, 401, 408, 409, 494

[56] References Cited

U.S. PATENT DOCUMENTS

| | | | |
|---|---|---|---|
| 3,950,306 | 4/1976 | Pews et al. | 524/101 |
| 3,959,219 | 5/1976 | Aoyama et al. | 524/101 |
| 3,962,174 | 6/1976 | Berardinelli | 524/408 |
| 3,980,616 | 9/1976 | Kimura et al. | 529/101 |
| 4,039,538 | 8/1977 | Klenkenberg et al. | 544/219 |
| 4,333,869 | 6/1982 | Marciandi et al. | 524/101 |

FOREIGN PATENT DOCUMENTS 52-90193 7/1977 Japan.

OTHER PUBLICATIONS

Tinuvin 328 Ultraviolet Light Absorber for Plastic and Coatings, ASTM D 2244-79, pp. 43-51.

Amnon et al., Chemical Abstracts, (75) 152887f, p. 56, 1971.

Research Disclosure, No. 15143-Nov. 1976, Industrial Opportunities Ltd.-HOMEWELL, HAVANT/Hampshire (GB), "Polymeric Flame Retardant Additives", pp. 53, 54.

Primary Examiner—John Kight
Assistant Examiner—Kriellion Morgan
Attorney, Agent, or Firm—Burns, Doane, Swecker & Mathis

[57] ABSTRACT

Disclosed is a photodiscoloration-resistant polyester resin composition comprising 100 parts by weight of a polyester resin and, incorporated therein, (1) 3 to 50 parts by weight of a brominated cyanuric acid ester compound; and (2) a benzotriazole-type ultraviolet stabilizer in an amount of up to 5 parts by weight per 100 parts by weight of the polyester resin. This composition is excellent in the flame retardance and photodiscoloration resistance, and bleeding of the contained flame retardant does not occur in this composition.

18 Claims, No Drawings

POLYESTER RESIN COMPOSITION RESISTANT AGAINST DISCOLORATION BY LIGHT

TECHNICAL FIELD

The present invention relates to a photodiscoloration-resistant polyester resin composition.

More particularly, the present invention relates to a polyester resin composition which is excellent in flame retardance and photodiscoloration resistance and which can provide a molded article free of bleeding of a flame retardant on the surface.

BACKGROUND ART

Thermoplastic polyester resins, especially polyethylene terephthalate and polybutylene terephthalate, are used in various fields with or without reinforcement with glass fibers or the like, and serve as engineering plastics having excellent mechanical and electrical properties and also having good chemical resistance and heat resistance. However, they are defective in that they are combustible. Therefore, from the industrial viewpoint, it is important to render these thermoplastic resins flame-retardant.

There are known various methods for rendering thermoplastic polyester resins flame-retardant. Ordinarily, a flame retardant capable of imparting a flame retardance is incorporated alone or in combination with a flame retardant assistant to obtain a flame-retarding effect. However, when known flame retardants are incorporated into polyester resins for exterior articles, significant discoloration is caused in the resulting exterior articles by the action of solar rays and their colors become incongruous with colors of other exterior articles, with the result that the value of the exterior articles is reduced. In case of articles other than such exterior articles, if molded articles of thermoplastic resins containing conventional flame retardants are used in a high-temperature atmosphere, the flame retardants bleed out on the surfaces of the molded articles to cause an undesirable whitening phenomenon. Accordingly, these flame retardants are not suitable for thermoplastic polyester resins for use in production of exterior articles and electrical parts to which a high voltage is applied.

DISCLOSURE OF THE INVENTION

We have made researches on various flame retardants with a view to eliminating the foregoing defects and, as a result, found that a brominated organic compound having a triazine ring is an effective flame retardant. We have now completed the present invention based on this finding. It also was found that when at least one member selected from ordinary ultraviolet stabilizers of the benzophenone, benzotriazole and phenyl salicylate types is incorporated into a polyester composition comprising the flame retardant of the present invention, the photodiscoloration resistance is improved. Furthermore, it was found when at least one member selected from ordinary antioxidants of the hindered phenol, amine and phosphite types is incorporated into a polyester composition comprising the above-mentioned flame retardant and ultraviolet stabilizer, the improvement of the photodiscoloration resistance is still enhanced.

By the term "polyester resin" used in the instant specification is meant a polymer of a glycol ester of terephthalic acid, isophthalic acid or an alkyl ester thereof. A blend of two or more of such polymers may be used in the present invention.

As the especially preferred polyester resin, there can be mentioned polybutylene terephthalate and a mixture of polybutylene terephthalate and polyethylene terephthalate.

At least one member selected from brominated cyanuric acid esters having a triazine ring, which are represented by the following general formula, is used as the flame retardant in the present invention:

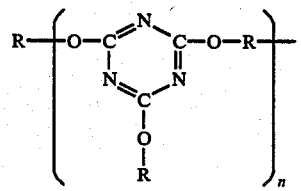

wherein n stands for the degree of polymerization, R stands for H, $R_1$ or $R_2$ with the proviso that if R is present on the terminal end of the polymer chain, $R_1$ or $R_2$ is terminated with H, OH, a halogen such as chlorine or bromine or $R_2$ (having H, OH or a halogen as the terminal group), $R_1$ stands for a group of the following formula:

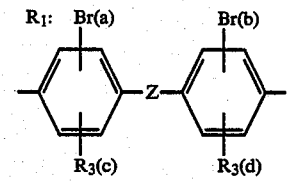

in which each of a, b, c and d is an integer indicating the number of substituents and these integers, a, b, c and d satisfy the relationship of $(a+b+c+d) \leq 8$, Z stands for an alkylidene or alkylene group, $-SO_2-$, $-SO-$, $-S-$, $-O-$ or a direct bond between the two phenylene groups, $R_3$ stands for a lower alkyl group or a halogenated lower alkyl group (chlorine or bromine is preferred as the halogen), $R_2$ stands for a group of the following formula:

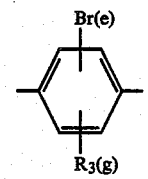

in which e and g are integers indicating numbers of substituents, which satisfy the relationship of $(e+g) \leq 5$, and at least one of R's is $R_1$ and the terminal of $R_1$ is H, OH or $R_2$.

Ordinary flame retardants include chlorine type and bromine type ones. The degree of discoloration due to the light such as solar rays is higher in chlorine type than in fluorine type retardants. Accordingly, it is preferred to use a bromine type flame retardant.

If the amount of the flame retardant used in the present invention is increased, the mechanical properties of the composition are degraded. Accordingly, it is preferred that the amount of the flame retardant added be as small as possible.

In the present invention, the flame retardant is added in an amount of 3 to 50 parts by weight, preferably 3 to 20 parts by weight, per 100 parts by weight of the polyester resin.

In the present invention, the flame retardant alone may be incorporated into the polyester resin. However, if the flame retardant is used in combination with a flame retardant assistant, the flame-retarding effect can be enhanced.

As the flame retardant assistant, there can be mentioned, for example, antimony compounds such as antimony trioxide and antimony halides, and metal compounds containing zinc or bismuth.

When a filler such as glass fiber, especially a filler which prevents dropping during combustion, is added, the amounts of addition of the flame retardant and the flame retardant assistant can be reduced.

The molecular weight of the flame retardant used in the present invention can be determined according to the kneading processability of the flame retardant and other additives into the polyester resin and the molding processability and physical properties of the polyester resin composition. Ordinarily, the average molecular weight of the flame retardant is appropriately addjusted to 3000 to 8000. Of course, a molecular weight outside this range may be adopted according to the processability and physical properties.

The present invention will now be described with reference to polybutylene terephthalate (hereinafter referred to as "PBT") having excellent properties as a molding material by way of example.

As means for rendering PBT flame-retardant, there can be mentioned a method in which a flame retardant is added to PBT and a method in which a reactive flame retardant is included in the chain of PBT. As typical instances of the former type method, there can be mentioned a method in which decabromodiphenyl is added to PBT (see Japanese Patent Laid-Open No. 2086/71), and a method in which a halide such as brominated phthalic anhydride, brominated diphenyl or brominated diphenyl ether is added to glass-reinforced PBT (Japanese Patent Publication No. 12413/73). As a typical instance of the latter type method using a reactive flame retardant, there can be mentioned a method in which brominated terephthalic acid is added to PBT (Japanese Patent Laid-Open No. 133253/75).

Exterior molded articles of PBT including decabromodiphenyl ether, which is an ordinary flame retardant of the additive type, for example, automobile parts and electrical instrument parts, are drastically discolored by solar rays and the like and their colors become incongruous with colors of other materials, with the result that their commercial values are reduced and they cannot be used at all in an extreme case.

A PBT composition comprising the flame retardant of the present invention has an excellent photodiscoloration resistance. When a non-reinforced molded article of PBT comprising decabromodiphenyl ether as the flame retardant and antimony trioxide as the flame retardant assistant, which has a flame retardance of V-0 (as determined according to the method of UL-94), is exposed to a sunshine weatherometer (63° C. × 12 minutes/60 minutes' water spraying) for 200 hours, the molded article is discolored in a yellowish brown color.

In case of a molded article having a flame retardance of V-2 (as determined according to the method of UL-94), which is prepared by reducing the amount of addition of the flame retardant while using the same amount of the flame retardant assistant, the discoloration resistance is improved to some extent but yellowing is conspicuous. Accordingly, in order to improve the discoloration resistance in a composition comprising the conventional flame retardant system, the flame retardance should be sacrificed.

When a PBT composition comprising the flame retardant of the present invention, which has a flame retardance of V-0 (as determined according to the method of UL-94), is irradiated under the same conditions as described above, the degree of discoloration is very low and the discoloration resistance is highly improved over that of a flame-retardant composition comprising decabromodiphenyl ether.

When values L, a and b of the Hunter colorimetric system are measured and the color difference value $\Delta E$ is calculated according to the following formula, it is found that the value $\Delta E$ of the PBT composition of the present invention is much smaller than that of a PBT composition comprising a conventional flame retardant and the photodiscoloration resistance of the PBT composition of the present invention is highly improved:

$$\Delta E = \sqrt{(L - L_o)^2 + (a - a_o)^2 + (b - b_o)^2}$$

wherein $L_o$, $a_o$ and $b_o$ are values of the color before irradiation and L, a and b are those after irradiation.

The value $\Delta E$ of the PBT composition of the present invention in which the flame retardance is adjusted to V-2 by reducing the amount of the flame retardant added is much smaller than that of the PBT composition having a flame retardance of V-0, and the photodiscoloration resistance is remarkably improved.

The flame retardant of the present invention is characterized in that it imparts an excellent photodiscoloration resistance without sacrifice of the flame retardance.

An ultraviolet stabilizer customarily used may be incorporated into the flame-retardant composition of the present invention. For example, when at least one member selected from ultraviolet stabilizers of the benzophenone, benzotriazole and phenyl salicylate types is incorporated in the composition in an amount of up to 5 parts by weight, preferably up to 2 parts by weight, per 100 parts by weight of the polyester resin, the photodiscoloration resistance is further improved. Moreover, a known antioxidant may be incorporated into the composition of the present invention comprising the above-mentioned ultraviolet stabilizer. For example, when at least one member selected from antioxidants of the hindered phenol, amine and phosphite types is incorporated in an amount of up to 5 parts by weight, preferably up to 2 parts by weight, per 100 parts by weight of the polyester resin, the photodiscoloration resistance is enhanced.

In case of a PBT composition comprising the flame retardant of the present invention, bleeding of the flame retardant on the surface of a molded article is not observed even if the molded article is exposed to a high-temperature atmosphere. When a molded article of PBT comprising decabromodiphenyl ether, a conventional additive type flame retardant, and having a flame retardance of V-0 (as determined according to the method of UL-94) is exposed to a hot air current at 60°

C. for 5 hours, bleeding of the flame retardant on the surface of the molded article takes place and occurrence of a whitening phenomenon is observed. This whitening phenomenon results not only in reduction of the flame retardance but also in degradation of the appearance of an exterior part. Furthermore, a composition in which whitening is readily caused cannot be used for an electrical part of which a high voltage is applied, for example, a switch part. This undesirable phenomenon of bleeding occurs depending on the compatibility of the flame retardant with PBT, the dispersibility of the flame retardant and the molecular weight of the flame retardant.

Occurrence of this bleeding phenomenon is not observed in the flame-retardant composition of the present invention even when it is exposed to a hot air current at 140° C. for 24 hours. When an ultraviolet stabilizer of the benzotriazole type and an antioxidant of the hindered phenol type are incorporated into the flame-retardant composition of the present invention, the photodiscoloration resistance is drastically improved by the synergistic effect of these additives. Even if these ultraviolet stabilizer and antioxidant are incorporated in a PBT composition comprising a conventional flame retardant, no substantial improvement of the photodiscoloration can be attained.

The flame-retardant PBT composition of the present invention is excellent also in thermal properties. More specifically, the thermal distortion temperature (as determined under 18.6 kg/cm$^2$ according to the method D-618A) of the PBT composition of the present invention having a flame retardance of V-0 (as determined according to the method of UL-94) is much higher than that of a PBT composition of the non-reinforced type comprising decabromodiphenyl ether, a conventional flame retardant, and having the same flame retardance, and the PBT composition of the present invention is highly improved in the thermal properties. Accordingly, the composition of the present invention is suitable for uses where stress is applied at a higher temperature. Moreover, it has been confirmed that the flame-retardant composition of the present invention is superior to conventional flame-retardant compositions in substantially all of other physical properties.

As the reinforcing filler that can be used in the present invention, there can be mentioned, for example, fibrous materials such as glass fibers, carbon fibers, asbestos and synthetic fibers, flaky materials such as glass flakes, mica and talc, granular materials such as glass beads and powdery materials such as clay, calcium carbonate, carbon, metals and metal compounds. These fillers may be used alone or in the form of a mixture of two or more of them.

These fillers may be surface-treated with a coupling agent or the like.

The composition of the present invention may further comprise a heat stabilizer, a pigment, a dye, a lubricant, a plasticizer, a parting agent, an ultraviolet stabilizer, a nucleating agent, a coupling agent, an agent for preventing dropping during combustion, a substance for improving mechanical properties and long-period thermal stability, and various resins such as a phenoxy resin.

A composition formed by incorporating a phenoxy resin into a glass fiber-reinforced polyester resin composition having a flame retardance of V-0 (as determined according to the method of UL-94) is superior to the phenoxy resinfree polyester resin composition in the mechanical properties under long-time high-temperature heating.

In case of the composition of the present invention comprising a pigment such as titanium white, the photodiscoloration resistance is especially improved.

Kneading of the composition of the present invention is accomplished by blending the respective ingredients by using a blender and then an extruder, preferably a vented extruder. The temperature of the cylinder of the extruder is set at 180° to 300° C., preferably 230° to 270° C.

In the present invention, the photodiscoloration resistance is evaluated according to the following procedures.

A test piece formed by injection is irradiated under conditions of 63° C. for 12 minutes and 60 minutes' water spraying by using a sunshine super long life weatherometer (Model WELL-SUN-HC supplied by Suga Shikenki Kabushiki Kaisha), and the color is examined with the naked eye. Then, the values L, a and b of the Hunter colorimetric system are measured by using a digital colorimetric color difference meter (Model ND 504AA supplied by Nippon Denshoku Kogyo Kabushiki Kaisha).

The flame retardance of the composition in the present invention is evaluated according to the method of UL-94 the Underwriter's Laboratories Standard. A combustion test piece (having a length of 5 inch, a width of ½ inch and a thickness of 1/32 inch) is molded by an injection molding machine. According to the method of UL-94, the test piece is pre-treated and subjected to the combustion test.

The present invention will now be described in detail with reference to the following Examples.

EXAMPLES 1 THROUGH 18 AND
COMPARATIVE EXAMPLE 1 THROUGH 8

AFR 3001-L (average molecular weight=3000) and AFR 3001-H (average molecular weight=8000), each being a product of Asahi Glass, were used as the flame retardant of the present invention having a triazine ring, and decabromodiphenyl ether was used as a comparative flame retardant. Furthermore, there were used 2-(2'-hydroxy-3',5'-di-isoamyl-phenyl)benzotriazole as an ultraviolet stabilizer and pentaerythrithyl tetrakis [3-(3,5-di-tert-butyl-4-hydroxyphenyl)propionate] as the antioxidant. A composition formed by incorporating these additives into PBT or a mixture of PBT and a polyethylene terephthalate resin as shown in Tables given below was kneaded and pelletized by using a vented extruder having a screw shaft with a diameter of 65 mm, and a test piece was formed by an injection molding machine and the physical properties were determined.

TABLE 1

|  | Example 1 | Example 2 | Example 3 | Example 4 | Comparative Example 1 | Comparative Example 2 | Comparative Example 3 |
|---|---|---|---|---|---|---|---|
| polybutylene terephthalate (wt. %) | 78.3 | 78.3 | 91.7 | 70.5 |  | 81.4 | 90.7 |
| polyethylene tere- |  |  |  | 7.8 | 100 |  |  |

TABLE 1-continued

|  | Example 1 | Example 2 | Example 3 | Example 4 | Comparative Example 1 | Comparative Example 2 | Comparative Example 3 |
|---|---|---|---|---|---|---|---|
| phthalate (wt. %) |  |  |  |  |  |  |  |
| flame retardant | Asahi Glass AFR3001-L | Asahi Glass AFR3001-H | Asahi Glass AFR3001-H | Asahi Glass AFR3001-H |  | decabromodiphenyl ether | decabromodiphenyl ether |
| average molecular weight | 3000 | 8000 | 8000 | 8000 |  |  |  |
| photodiscoloration resistance |  |  |  |  |  |  |  |
| naked eye observation | slightly discolored | slightly discolored | hardly discolored | slightly discolored | hardly discolored | much discolored | greatly discolored |
| ΔE | 11.5 | 11.0 | 7.7 | 12.0 | 7.0 | 43.0 | 34.0 |
| flame retardance (method of UL-94) | V-0 | V-0 | V-2 | V-0 |  | V-0 | V-2 |
| amount of flame retardant (wt. %) | 17.4 | 17.4 | 4.0 | 17.4 |  | 13.9 | 5.0 |
| amount of antimony trioxide (wt. %) | 4.3 | 4.3 | 4.3 | 4.3 |  | 4.7 | 4.3 |

TABLE 2

|  | Example 5 | Example 6 | Example 7 | Example 8 | Example 9 | Comparative Example 4 | Comparative Example 5 | Comparative Example 6 | Comparative Example 7 |
|---|---|---|---|---|---|---|---|---|---|
| polybutylene terephthalate (wt. %) | 77.3 | 77.3 | 77.6 | 78.0 | 69.6 | 99.0 | 99.3 | 80.4 | 80.4 |
| polyethylene terephthalate (wt. %) |  |  |  |  | 7.7 |  |  |  |  |
| flame retardant | Asahi Glass AFR 3001-L | Asahi Glass AFR 3001-H | Asahi Glass AFR 3001-H | Asahi Glass AFR 3001-H | Asahi Glass AFR 3001-H |  |  | decabromodiphenyl ether | decabromodiphenyl ether |
| average molecular weight | 3000 | 8000 | 8000 | 8000 | 8000 |  |  |  |  |
| photodiscoloration resistance |  |  |  |  |  |  |  |  |  |
| naked eye observation | hardly discolored | hardly discolored | hardly discolored | hardly discolored | hardly discolored | hardly discolored | hardly discolored | much discolored | much discolored |
| ΔE | 6.0 | 5.9 | 7.2 | 7.5 | 6.5 | 6.5 | 6.8 | 36.6 | 38.3 |
| flame retardance (method of UL-94) | V-0 | V-0 | V-0 | V-0 | V-0 |  |  | V-0 | V-0 |
| amount of flame retardant (wt. %) | 17.4 | 17.4 | 17.4 | 17.4 | 17.4 |  |  | 13.9 | 13.9 |
| amount of antimony trioxide (wt. %) | 4.3 | 4.3 | 4.3 | 4.3 | 4.3 |  |  | 4.7 | 4.7 |
| amount of ultraviolet stabilizer (wt. %) | 0.7 | 0.7 | 0.7 |  | 0.7 | 0.7 | 0.7 | 0.7 | 0.7 |
| amount of antioxidant (wt. %) | 0.3 | 0.3 |  | 0.3 | 0.3 | 0.3 |  | 0.3 |  |

TABLE 3

|  | Test method | Example 2 | Example 10 | Comparative Example 2 | Comparative Example 8 |
|---|---|---|---|---|---|
| tensile strength (kg/cm²) | D-638 | 615 | 1420 | 603 | 1405 |
| tensile elongation at break (%) |  | 3.0 | 1.8 | 2.6 | 1.8 |
| Izod impact | D-256 |  |  |  |  |

TABLE 3-continued

| | Test method | Example 2 | Example 10 | Comparative Example 2 | Comparative Example 8 |
|---|---|---|---|---|---|
| strength (kg.cm/cm) | | | | | |
| notched | | 2.7 | 8.5 | 2.9 | 8.0 |
| without notch | | 32.9 | 68.1 | 32.9 | 66.8 |
| thermal distortion temperature (°C.) (18.6 kg/cm²) | D-648 | 70.1 | 211 | 57 | 211 |
| flame retardance | UL-94 | V-0 | V-0 | V-0 | V-0 |
| bleeding (140° C. × 66 hours) | | not | not | observed | observed |

TABLE 4

| | Example 10 | Example 11 | Example 12 | Example 13 | Example 14 | Example 15 | Example 16 | Example 17 | Example 18 | Comparative Example 8 |
|---|---|---|---|---|---|---|---|---|---|---|
| resin | polybutylene terephthalate | | | | | | | | polybutylene terephthalate + polyethylene terephthalate | polybutylene terephthalate |
| flame retardant | Asahi Glass AFR30001-H (average molecular weight = 8000) | | | | | | | | | decabromodiphenyl ether |
| photodiscoloration resistance | | | | | | | | | | |
| ΔE | 11.9 | 9.8 | 13.5 | 8.6 | 12.2 | 12.2 | 8.0 | 11.9 | 12.5 | 30.0 |
| additives (wt. %) | | | | | | | | | | |
| glass fiber | 30 | 15 | 15 | | | | 15 | 30 | 30 | 30 |
| glass flake | | 15 | | 40 | | 15 | | | | |
| mica | | | 15 | | | | | | | |
| beads | | | | | 30 | 15 | | | | |
| talc | | | | | | | 15 | | | |
| phenoxy resin | | | | | | | | | 1 | |

NB: The mixing weight ratio, polybutylene terephthalate/polyethylene terephthalate, in the resin of Example 13 is 90/10.

EXAMPLE 19

A phenoxy resin was added to a flame-retardant, glass fiber-reinforced PBT composition of the present invention (composition of Example 5), and a tensile strength test piece of the resulting composition was allowed to stand in a hot air drier maintained at a temperature of 195° C. The heat resistance characteristic was evaluated based on the standing time required for reducing the tensile strength to 50% of the tensile strength before the standing.

TABLE 5

| Example No. | Composition | Standing Time (hours) |
|---|---|---|
| Example 19 | Example 17 | 380 |
| Comparative Example 9 | Example 10 | 300 |

What is claimed is:

1. A photodiscoloration-resistant polyester resin composition comprising 100 parts by weight of a polyester resin and, incorporated therein, (1) 3 to 50 parts by weight of a brominated cyanuric acid ester compound; and (2) a benzotriazole-type ultraviolet stabilizer in an amount of up to 5 parts by weight per 100 parts by weight of the polyester resin; wherein the composition has a Hunter color difference, ΔE, of less than 10, as performed before and after a treatment wherein a molded article composition is exposed to irradiation for 200 hours by a sunshine weatherometer under conditions of 63° C. for 12 minutes and 60 minutes water spraying; and wherein $$\Delta E = \sqrt{(L - L_o)^2 + (a - a_o)^2 + (b - b_o)^2}$$

wherein $L_o$, $a_o$ and $b_o$ are values of the Hunter color before irradiation and L, a and b are values of the Hunter color after irradiation.

2. A composition as set forth in claim 1, which further comprises an antioxidant in an amount of up to 5 parts by weight per 100 parts by weight of the polyester resin.

3. A composition as set forth in claim 1, which further comprises a flame retardant assistant selected from the group consisting of antimony tririoxide, antimony halides, and metal compounds containing zinc or bismuth.

4. A composition as set forth in claim 1, wherein the polyester resin comprises polybutylene terephthalate.

5. A composition according to claim 1, wherein the ultraviolet stabilizer is 2-(2'-hydroxy-3',5'-di-isoamylphenyl)benzotriazole.

6. A composition as set forth in claim 1, wherein the composition has a flammability rating of V-0 or V-1 as determined by Underwriters Laboratories Standard Test No. UL-94.

7. A composition according to claim 3, wherein the flame retardant assistant comprises antimony trioxide.

8. A composition according to claim 2, wherein the antioxidant comprises pentaerythrithyl tetrakis [3-(3,5-di-tert-butyl-4-hydroxyphenyl)propionate].

9. A composition as set forth in claim 1, wherein the brominated cyanuric acid ester compound comprises a polymer with the following general formula:

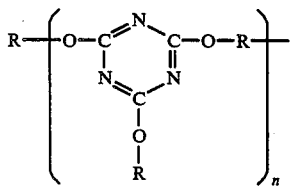

wherein
n stands for a whole number indicating the degree of polymerization;
R stands for H, $R_1$ or $R_2$ with the proviso that if R is present on the terminal end of the polymer chain, $R_1$ or $R_2$ is terminated with H, OH, a halogen or $R_2$ (having H, OH or a halogen as the terminal group);
$R_1$ stands for a group of the following formula:

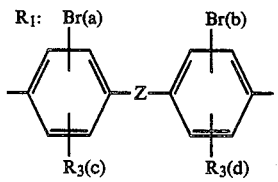

in which each of a, b, c and d is an integer indicating the number of substituents and the integers a, b, c and d satisfy the relationship of (a+b+c+d) 8; Z stands for an alkylidiene or alkylene group, $-SO_2-$, $-SO-$, $-S-$, $-O-$ or a direct bond between the two phenylene groups; $R_3$ stands for a lower alkyl group or a halogenated lower alkyl group;
$R_2$ stands for a group of the following formula:

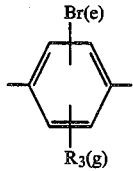

in which e and g are integers indicating numbers of substituents, which satisfy the relationship of (e+g) 5;
and at least one of the R's is $R_1$ and the terminal of $R_1$ is H, OH or $R_2$.

10. A composition as set forth in claim 1, wherein the brominated cyanuric acid ester compound has an average molecular weight within the range from 2,000 to 10,000.

11. A photodiscoloration-resistant polyester resin composition comprising 100 parts by weight of a polybutylene terephthalate resin and, incorporated therein, (1) 3 to 50 parts by weight of a brominated cyanuric acid ester compound; and (2) a glass flame retardant assistant selected from the group consisting of glass fiber and glass flake and mixtures thereof, in an amount of at least 5 parts by weight per 100 parts by weight of the polyester resin; and wherein the composition has a Hunter color difference $\Delta E$, of less than 10, as performed before and after a treatment wherein a molded article comprising the composition is exposed to a sunshine weatherometer for 200 hours under conditions of 63° C. for 12 minutes and 60 minutes water spraying; and wherein $$\Delta E = \sqrt{(L - L_o)^2 + (a - a_o)^2 + (b - b_o)^2}$$

wherein $L_o$, $a_o$ and $b_o$ are values of the Hunter color before irradiation and L, a and b are values of the Hunter color after irradiation.

12. A composition as set forth in claim 11 comprising about 15 parts by weight of glass flake.

13. A composition as set forth in claim 11, which comprises about 40 parts by weight of glass flake.

14. A composition as set forth in claim 11, which further comprises about 15 parts by weight of talc.

15. A resin composition as set forth in claim 9, wherein said brominated cyanuric acid ester compound has an average molecular weight in the range of from about 3000 to about 8000.

16. A composition as set forth in claim 9, wherein the molecular weight and degree of polymerization of the brominated cyanuric acid ester polymer are determined according to the kneading processability of the flame retardant and other additives into the polyester resin and the molding processability and physical properties of the polyester resin composition.

17. A photodiscoloration resistant polyester resin composition having a flame retardance rating of at least V-2 when tested under the UL-94 combustion test and comprising 100 parts by weight of a polyester resin and, incorporated therein, (1) 3 to 50 parts by weight of a brominated cyanuric acid ester compound; (2) a benzotriazole-type ultraviolet stabilizer in an amount of up to 5 parts by weight per 100 parts by weight of the polyester resin; and (3) an antioxidant in an amount of up to 5 parts by weight per 100 parts by weight of the polyester resin; wherein the composition has a Hunder color difference, $\Delta E$, of less than 10, as performed before and after a treatment wherein a molded article composition is exposed to a sunshine weatherometer under conditions of 63° C. for 12 minutes and 60 minutes water spraying for 200 hours; and wherein $$\Delta E = (L-L_o)^2 + (a-a_o)^2 + (b-b_o)^2,$$

wherein $L_o$, $a_o$ and $b_o$ are values of the Hunter color before irradiation and L, a and b are values of the Hunter color after irradiation.

18. A composition as set forth in claim 17 further comprising a flame retardant assistant selected from the group consisting of antimony trioxide, antimony halides, and metal compounds containing zinc or bismuth.

* * * * *